US012728739B2

(12) United States Patent
Schlüter et al.

(10) Patent No.: US 12,728,739 B2
(45) Date of Patent: Sep. 8, 2026

(54) APPARATUS FOR THE ELECTRICAL CHARGING OF AN ELECTRICAL BATTERY UNIT OF A VEHICLE

(71) Applicant: Scania CV AB, Södertälje (SE)

(72) Inventors: Ortwin Schlüter, Järna (SE); Andreas Zafeiropoulos, Aten (GR)

(73) Assignee: Scania CV AB, Södertälje (SE)

( * ) Notice: Subject to any disclaimer, the term of this patent is extended or adjusted under 35 U.S.C. 154(b) by 775 days.

(21) Appl. No.: 18/007,781

(22) PCT Filed: May 12, 2021

(86) PCT No.: PCT/SE2021/050456
§ 371 (c)(1),
(2) Date: Dec. 2, 2022

(87) PCT Pub. No.: WO2021/251863
PCT Pub. Date: Dec. 16, 2021

(65) Prior Publication Data

US 2023/0249561 A1 Aug. 10, 2023

(30) Foreign Application Priority Data

Jun. 9, 2020 (SE) .................................. 2050670-5

(51) Int. Cl.
*B60L 53/16* (2019.01)
*B60L 5/00* (2006.01)
(Continued)

(52) U.S. Cl.
CPC ................ *B60L 53/16* (2019.02); *B60L 5/00* (2013.01); *B60L 5/24* (2013.01); *B60L 53/14* (2019.02);
(Continued)

(58) Field of Classification Search
CPC ........ B60L 53/16; B60L 53/305; B60L 53/66; B60L 53/11; B60L 53/18; B60L 53/32;
(Continued)

(56) References Cited

U.S. PATENT DOCUMENTS

2016/0167524 A1* 6/2016 Bedell ...................... B60L 5/42
191/22 R
2016/0167530 A1 6/2016 Bolik et al.
(Continued)

FOREIGN PATENT DOCUMENTS

CA 3028016 A1 12/2017
CN 106536262 A 3/2017
(Continued)

OTHER PUBLICATIONS

Machine translation of DE-102017000917-A1 (Year: 2025).*
(Continued)

*Primary Examiner* — David V Henze
(74) *Attorney, Agent, or Firm* — Moore & Van Allen PLLC; W. Kevin Ransom

(57) ABSTRACT

An apparatus for the charging of an electric battery unit of a vehicle, wherein the apparatus comprises an interface for connecting the battery unit to one or more of: a first electrical contact element of a pantograph and a second electrical contact element of the pantograph. The interface comprises one or more connectors. The connector comprises first and second electrically conductive members. The first electrically conductive member comprises a longitudinal side for electrical contact with one of the first and second electrical contact elements while the second electrically conductive member comprises a longitudinal side for electrical contact with the other one of the first and second electrical contact elements. The first and second electrically conductive members are spaced apart from one another. The
(Continued)

connector comprises one holder for holding the first and second electrically conductive members, the holder being attachable to the vehicle. A vehicle including such an apparatus.

14 Claims, 4 Drawing Sheets

(51) Int. Cl.
*B60L 5/24* (2006.01)
*B60L 53/14* (2019.01)
*B60L 53/30* (2019.01)
*B60L 53/66* (2019.01)

(52) U.S. Cl.
CPC ............. *B60L 53/305* (2019.02); *B60L 53/32* (2019.02); *B60L 53/66* (2019.02)

(58) Field of Classification Search
CPC .... B60L 53/14; B60L 5/24; B60L 5/00; H02J 7/0045; H02J 7/0042
See application file for complete search history.

(56) References Cited

U.S. PATENT DOCUMENTS

| | | | | |
|---|---|---|---|---|
| 2017/0080813 | A1 | 3/2017 | Bedell et al. | |
| 2017/0158074 | A1 | 6/2017 | Buehs et al. | |
| 2017/0217324 | A1 | 8/2017 | Buehs et al. | |
| 2019/0193585 | A1* | 6/2019 | Raaijmakers | B60L 53/18 |
| 2019/0351779 | A1 | 11/2019 | Patwardhan | |
| 2021/0300185 | A1 | 9/2021 | Bode et al. | |

FOREIGN PATENT DOCUMENTS

| | | | | |
|---|---|---|---|---|
| CN | 207311147 | U * | 5/2018 | |
| DE | 202015102998 | U1 | 8/2015 | |
| DE | 102017000917 | A1 * | 8/2018 | B60L 53/14 |
| EP | 3010748 | A1 | 4/2016 | |
| EP | 3357741 | A1 | 8/2018 | |
| WO | WO-2017216260 | A1 * | 12/2017 | B60L 53/16 |
| WO | 2018010896 | A1 | 1/2018 | |
| WO | WO-2018086884 | A1 * | 5/2018 | B60L 5/00 |

OTHER PUBLICATIONS

Machine translation of WO-2018086884-A1 (Year: 2025).*
Machine translation of CN 207311147 U (Year: 2025).*
Scania CV AB, International Patent Application No. PCT/SE2021/050456, International Preliminary Report on Patentability, Dec. 13, 2022.
Scania CV AB, European Patent Application No. 21821800.6, Invitation pursuant to Rule 62a(1) EPC, Jul. 10, 2024.
Scania CV AB, Chinese Patent Application No. 202180039037.3, First Office Action, Feb. 14, 2025.
Scania CV AB, European Patent Application No. 21821800.6, Extended European Search Report, Nov. 29, 2024.
Scania CV AB, International Patent Application No. PCT/SE2021/050456, International Search Report, Jun. 2, 2021.
Scania CV AB, International Patent Application No. PCT/SE2021/050456, Written Opinion, Jun. 2, 2021.
Scania CV AB, Swedish Patent Application No. 2050670-5, Office Action, Feb. 19, 2021.
Scania CV AB, Chinese Patent Application No. 202180039037.3, Office Action, Jun. 26, 2025.

* cited by examiner

APPARATUS FOR THE ELECTRICAL CHARGING OF AN ELECTRICAL BATTERY UNIT OF A VEHICLE

CROSS-REFERENCE TO RELATED APPLICATIONS

This application is a National Stage Patent Application (filed under 35 § U.S.C. 371) of PCT/SE2021/050456, filed May 12, 2021, of the same title, which, in turn claims priority to Swedish Patent Application No. 2050670-5 filed Jun. 9, 2020, of the same title; the contents of each of which are hereby incorporated by reference.

FIELD OF THE INVENTION

Aspects of the present invention relate to an apparatus for the electrical charging of one or more electric battery units of a vehicle. The apparatus comprises a charging interface for electrically connecting the electrical battery unit of the vehicle to a pantograph. Further, aspects of the present invention also relate to a vehicle comprising an apparatus of the above-mentioned sort.

BACKGROUND OF THE INVENTION

When charging an electric battery of an electrical vehicle or a hybrid vehicle, such as a bus, a charging interface associated with or involving a pantograph may be used. The pantograph may be mounted to a charging station, for example to an overhead structure of the charging station.

SUMMARY OF THE INVENTION

The inventors of the present invention have identified drawbacks in conventional charging interfaces associated with or involving a pantograph, for example with regard to the mounting of the charging interface to the vehicle, for example to the roof of the vehicle. The mounting of conventional charging interfaces, which are associated with a pantograph, to the vehicle may be complex.

An object of embodiments of the invention is to provide a solution which mitigates or solves drawbacks and problems of conventional solutions.

The above and further objects are solved by the subject matter of the independent claims. Further advantageous embodiments of the invention can be found in the dependent claims.

According to a first aspect of the invention, the above mentioned and other objects are achieved with an apparatus for the electrical charging of one or more electric battery units of a vehicle, wherein the apparatus comprises a charging interface for electrically connecting the electrical battery unit of the vehicle to one or more of: a first electrical contact element of a pantograph and a second electrical contact element of the pantograph, wherein the charging interface comprises one or more connectors, wherein the connector comprises a first electrically conductive member and a second electrically conductive member, wherein the first electrically conductive member comprises at least one longitudinal side for electrical contact with one of the first and second electrical contact elements of the pantograph while the second electrically conductive member comprises at least one longitudinal side for electrical contact with the other one of the first and second electrical contact elements of the pantograph, wherein the first electrically conductive member is spaced apart from the second electrically conductive member, and wherein the connector comprises one holder for holding the first and second electrically conductive members, the holder being attachable to the vehicle.

An advantage of the apparatus according to the first aspect, since each connector of the charging interface includes a holder that holds both the first second electrically conductive member and the second electrically conductive members, is that the mounting of the charging interface and of the first and second electrically conductive members is facilitated, made less complicated and made less complex in relation to conventional charging interfaces. In general, conventional charging interfaces associated with or involving a pantograph for charging an electric battery of a vehicle, such as a bus, include four electrically conductive members (which may be called rails in conventional technology), which should make electrical contact with the electrical contact elements of the pantograph when charging the electrical battery of the vehicle. In conventional charging interfaces, each electrically conductive member (which may be called rail, as mentioned above) is separately or individually mounted to the roof of the vehicle. The mounting of the first and second electrically conductive members of the same connector by one single holder according to the first aspect of the invention requires fewer mounting parts, such as attachments, in relation to conventional charging interfaces, since, for example, only two connectors (instead of four connectors) need to be attached to the vehicle for mounting four electrically conductive members, because of the innovative holder. The result of fewer attachments is that less weight is added to the vehicle when mounting the charging interface to the vehicle, which in the long run results is in a reduced consumption of electric power, or a reduced consumption of fuel, to drive the vehicle, compared to conventional charging interfaces. Further, the manufacturing cost of the charging interface is reduced. Since the mounting of the charging interface is less complicated and less complex, the charging interface is more reliable and robust, whereby the vehicle uptime is increased.

The apparatus according to the first aspect may be called an electrical apparatus. The charging interface may be called an electrical charging interface. It may be defined that the holder is individually attachable, or attached, to the vehicle.

According to an advantageous embodiment of the apparatus according to the first aspect, the first and second electrically conductive members of the connector and the holder of the same connector form a single unit. As also stated above, this embodiment facilitates the mounting of the charging interface to the vehicle, and makes the mounting of the charging interface to the vehicle less complicated and less complex in relation to conventional charging interfaces, resulting in less weight added to the vehicle when mounting the charging interface to the vehicle compared to conventional charging interfaces. Further, the manufacturing cost of the charging interface is reduced.

According to a further advantageous embodiment of the apparatus according to the first aspect, the first electrically conductive member is configured for the transfer of electrical signals conveying information between an electronic control unit of the vehicle and any one of the first and second electrical contact elements of the pantograph while the second electrically conductive member is configured for the transfer of electric power to the electrical battery unit of the vehicle from one or more of: the first electrical contact element of the pantograph and the second electrical contact element of the pantograph. Conventional charging interfaces, which are associated with or involve a pantograph for charging an electric battery of a vehicle, need to transfer electrical signals conveying information on two electrically conductive members of the four electrically conductive members and to transfer electric power to the electrical battery on the other two electrically conductive members. Electrical signals need to be transferred between the pantograph (charging station) and the vehicle (electronic control unit) to, at least initially, transfer information between the pantograph and the vehicle, for example for identification purposes. The four electrically conductive members of a conventional charging interface are identical, wherein they are all designed to be able to transfer or conduct electric power to the electrical battery of the vehicle, since the electric power is transferred at a higher voltage than the electrical signals conveying information, which preferably are transferred at a lower voltage. Thus, one may say that the electrically conductive members transferring electrical signals conveying information and their electrical connections are overdesigned or too excessively dimensioned. Further, the inventors have found that the electrically conductive members of conventional charging interfaces are not suitable for the purpose of transferring the electrical signals conveying information. An advantage of this embodiment of the apparatus according to the first aspect, when two connectors are involved, is that the two electrically conductive members transferring the electrical signals conveying information are suitable for their purpose, whereby the transfer of electrical signals conveying information between the pantograph and the vehicle is made more robust, reliable, secure and efficient. Thus, an advantage of this embodiment is that a more robust, reliable, secure and efficient communication between the pantograph (charging station) and the vehicle (electronic control unit) is provided. Since the design is more robust and reliable, the vehicle uptime is increased. More specifically, it may be defined that first electrically conductive member is adapted for the transfer of electrical signals conveying information between an electronic control unit of the vehicle and any one of the first and second electrical contact elements of the pantograph while the second electrically conductive member is adapted for the transfer of electric power to the electrical battery unit of the vehicle from one or more of: the first electrical contact element of the pantograph and the second electrical contact element of the pantograph. One may say that each of the first and second electrically conductive members is optimized for its purpose, i.e. the transfer of electrical signals conveying information or the transfer of electric power to the electrical battery unit. It may be defined that the composition, structure and/or configuration of the first electrically conductive member are/is different from the composition, structure and/or configuration of the second electrically conductive member.

According to another advantageous embodiment of the apparatus according to the first aspect, the connector comprises an electrical connecting unit for a line for the transfer of electrical signals conveying information between the first electrically conductive member and an electronic control unit of the vehicle and a line for heat transfer from a heater of the vehicle to the first and second electrically conductive members. Thus, one and the same electrical connecting unit connects to both the line for the transfer of electrical signals conveying information between the first electrically conductive member and the electronic control unit of the vehicle and the line for the heat transfer from the heater of the vehicle to the first and second electrically conductive members. Expressed alternatively, each connector, which includes two electrically conductive members, is associated with or includes one electrical connecting unit for the transfer of electrical signals conveying information and the heat transfer. An advantage of this embodiment is that the number of electrical connections of the charging interface is reduced. Further, it may be defined that the connector comprises a second electrical connecting unit for a line for the transfer of electric power to the electrical battery unit of the vehicle. Thus, according to this embodiment, a pair of electrically conductive members is associated with only two electrical connecting units or only two electrical connections. In conventional charging interfaces, which are associated with or involve a pantograph for charging an electric battery of a vehicle, each electrically conductive member has, or is associated with, its own electrical connection for a line for heat transfer from a heater of the vehicle to the electrically conductive members and its own electrical connection for a line for the transfer electrical signals conveying information or a line for the transfer of electric power to the electrical battery unit of the vehicle. Thus, in conventional charging interfaces, each electrically conductive member is associated with two electrical connections, or stated alternatively, each pair of electrically conductive members is associated with four electrical connections. By reducing the number of electrical connections in accordance with this embodiment, the complexity of the charging interface and the complexity of its mounting are efficiently reduced in relation to conventional charging interfaces. Since the charging interface is less complex, the charging interface is more reliable and robust, whereby the vehicle uptime is increased. Further, the result of fewer electrical connections is that less weight is added to the vehicle when electrically connecting the charging interface to the vehicle, which in the long run results is in a reduced consumption of electric power, or a reduced consumption of fuel, to drive the vehicle, compared to conventional charging interfaces. Further, the manufacturing cost of the charging interface is reduced.

According to yet another advantageous embodiment of the apparatus according to the first aspect, the first electrically conductive member is electrically insulated from the second electrically conductive member.

According to still another advantageous embodiment of the apparatus according to the first aspect, the holder electrically insulates the first electrically conductive member from the second electrically conductive member. An advantage of this embodiment is that is that an efficient electrical insulation of the first electrically conductive member from the second electrically conductive member is provided. Thus, this embodiment provides a robust and secure charging interface, which is associated with a pantograph for charging an electric battery unit of a vehicle.

According to an advantageous embodiment of the apparatus according to the first aspect, the holder is attachable to an exterior part of the vehicle, and wherein the holder is configured to electrically insulate the first and second electrically conductive members from the exterior part of the vehicle.

According to a further advantageous embodiment of the apparatus according to the first aspect, the holder is attachable to a roof of the vehicle, and wherein the holder is configured to electrically insulate the first and second electrically conductive members from the roof of the vehicle.

According to another advantageous embodiment of the apparatus according to the first aspect, the holder is at least partly made of an electrically insulating material. For example, the exterior of the holder may be made of an electrically insulating material while the core of the holder is made of any other material, for example an electrically conducting material, such as a metal or a metal alloy.

According to still another advantageous embodiment of the apparatus according to the first aspect, at any location on the longitudinal side the longitudinal side is configured to make electrical contact with any one of: the first electrical contact element of the pantograph and the second electrical contact element of the pantograph.

According to an advantageous embodiment of the apparatus according to the first aspect, the charging interface comprises two connectors spaced apart from one another.

According to an advantageous embodiment of the apparatus according to the first aspect, the first electrically conductive member of one of the two connectors faces the second electrically conductive member of the other one of the two connectors. An advantage of this embodiment is that it is assured that the transverse electrical contact element of the pantograph makes electrical contact with both an electrically conductive member (the first electrically conductive member) of the charging interface which transfers electrical signals conveying information and an electrically conductive member (the second electrically conductive member) of the charging interface which transfers electric power to the electrical battery unit of the vehicle. Thus, an advantage of this embodiment is that a robust, efficient and secure charging interface, which is associated with a pantograph for charging an electric battery unit of a vehicle, is attained.

According to a second aspect of the invention, the above mentioned and other objects are achieved with an arrangement for the electrical charging of one or more electric battery units of a vehicle, wherein the arrangement comprises

- a charging interface for electrically connecting the electrical battery unit of the vehicle to one or more of: a first electrical contact element of a pantograph and a second electrical contact element of the pantograph,
- wherein the charging interface comprises one or more connectors, wherein the connector comprises a first electrically conductive member and a second electrically conductive member,
- wherein the first electrically conductive member comprises at least one longitudinal side for electrical contact with one of the first and second electrical contact elements of the pantograph while the second electrically conductive member comprises at least one longitudinal side for electrical contact with the other one of the first and second electrical contact elements of the pantograph,
- wherein the first electrically conductive member is spaced apart from the second electrically conductive member, and
- wherein the first electrically conductive member is configured for the transfer of electrical signals conveying information between an electronic control unit of the vehicle and any one of the first and second electrical contact elements of the pantograph while the second electrically conductive member is configured for the transfer of electric power to the electrical battery unit of the vehicle from one or more of: the first electrical contact element of the pantograph and the second electrical contact element of the pantograph.

With reference to conventional charging interfaces associated with a pantograph for charging an electric battery unit of a vehicle described hereinabove, an advantage of the arrangement according to the second aspect is that each electrically conductive member transferring the electrical signals conveying information is suitable for its purpose, whereby the transfer of electrical signals conveying information between the pantograph and the vehicle is made more robust, reliable, secure and efficient. Thus, an advantage of the arrangement according to the second aspect is that a more robust, reliable, secure and efficient communication between the pantograph (charging station) and the vehicle (electronic control unit) is provided. Since the design is more robust and reliable, the vehicle uptime is increased. More specifically, it may be defined that first electrically conductive member is adapted for the transfer of electrical signals conveying information between an electronic control unit of the vehicle and any one of the first and second electrical contact elements of the pantograph while the second electrically conductive member is adapted for the transfer of electric power to the electrical battery unit of the vehicle from one or more of: the first electrical contact element of the pantograph and the second electrical contact element of the pantograph. One may say that each of the first and second electrically conductive members is optimized for its purpose, i.e. the transfer of electrical signals conveying information or the transfer of electric power to the electrical battery unit.

According to a third aspect of the invention, the above mentioned and other objects are achieved with a charging device for the electrical charging of one or more electric battery units of a vehicle, wherein the charging device comprises

- a charging interface for electrically connecting the electrical battery unit of the vehicle to one or more of: a first electrical contact element of a pantograph and a second electrical contact element of the pantograph,
- wherein the charging interface comprises one or more connectors, wherein the connector comprises a first electrically conductive member and a second electrically conductive member,
- wherein the first electrically conductive member comprises at least one longitudinal side for electrical contact with one of the first and second electrical contact elements of the pantograph while the second electrically conductive member comprises at least one longitudinal side for electrical contact with the other one of the first and second electrical contact elements of the pantograph,
- wherein the first electrically conductive member is spaced apart from the second electrically conductive member, and
- wherein the connector comprises an electrical connecting unit for a line for the transfer of electrical signals conveying information between the first electrically conductive member and an electronic control unit of the vehicle and a line for heat transfer from a heater of the vehicle to the first and second electrically conductive members.

Thus, according to the charging device of the third aspect, one and the same electrical connecting unit connects to both a line for the transfer of electrical signals conveying information between the first electrically conductive member and the electronic control unit of the vehicle and a line for the heat transfer from the heater of the vehicle to the first and second electrically conductive members. Expressed alternatively, each connector, which includes two electrically conductive members, is associated with or includes one electrical connecting unit for the transfer of electrical signals conveying information and the heat transfer. An advantage of the charging device of the third aspect is that the number of electrical connections of the charging interface is reduced. Further, it may be defined that the connector comprises a second electrical connecting unit for a line for the transfer of electric power to the electrical battery unit of the vehicle. Thus, in accordance with the charging device according to the third aspect, a pair of electrically conductive members is associated with only two electrical connecting units or with only two electrical connections. As already stated above, in conventional charging interfaces, which are associated with a pantograph for charging an electric battery of a vehicle, each electrically conductive member (which may be called rail, as mentioned above) has, or is associated with, a first electrical connection for a line for heat transfer from a heater of the vehicle to the electrically conductive members and a second electrical connection for a line for the transfer electrical signals conveying information or a line for the transfer of electric power to the electrical battery unit of the vehicle. Thus, in conventional charging interfaces, each electrically conductive member is associated with two electrical connections, or stated alternatively, each pair of electrically conductive members is associated with four electrical connections. By reducing the number of electrical connections in accordance with the charging device according to the third aspect, the complexity of the charging interface and the complexity of its mounting are efficiently reduced. Since the charging interface is less complex, the charging interface is more reliable and robust, whereby the vehicle uptime is increased. Further, the result of fewer electrical connections is that less weight is added to the vehicle when electrically connecting the charging interface to the vehicle, which in the long run results in a reduced consumption of electric power, or a reduced consumption of fuel, to drive the vehicle, compared to conventional charging interfaces. Further, the manufacturing cost of the charging interface is reduced.

According to a fourth aspect of the invention, the above mentioned and other objects are achieved with a vehicle comprising one or more of the group of:

- an apparatus according to any one of the above- or below-mentioned embodiments;
- an arrangement according to any one of the above- or below-mentioned embodiments; and
- a charging device according to any one of the above- or below-mentioned embodiments.

According to advantageous embodiments of the vehicle according to the fourth aspect, the holder is attached to the vehicle, for example to a roof or a roof unit of the vehicle.

According to a further advantageous embodiment of the vehicle according to the fourth aspect, the vehicle has a front and a rear, wherein the vehicle has a longitudinal extension extending between the front and the rear in a longitudinal direction, and wherein the longitudinal side extends in the longitudinal direction of the vehicle.

The vehicle may be a wheeled vehicle, i.e. a vehicle having wheels. The vehicle may for example be a bus, a tractor vehicle, a truck or a car. Other types of vehicles are possible.

The advantages of the vehicle according to the fourth aspect correspond to the above- or below-mentioned advantages of the apparatus according to the first aspect, the arrangement according to the second aspect or the charging device according to the third aspect and their embodiments.

The above- or below-mentioned features and embodiments of the apparatus, the arrangement, the charging device and the vehicle, respectively, may be combined in various possible ways providing further advantageous embodiments.

Further advantageous embodiments of the apparatus, the arrangement, the charging device and the vehicle according to the present invention and further advantages with the embodiments of the present invention emerge from the detailed description hereinbelow.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 1:
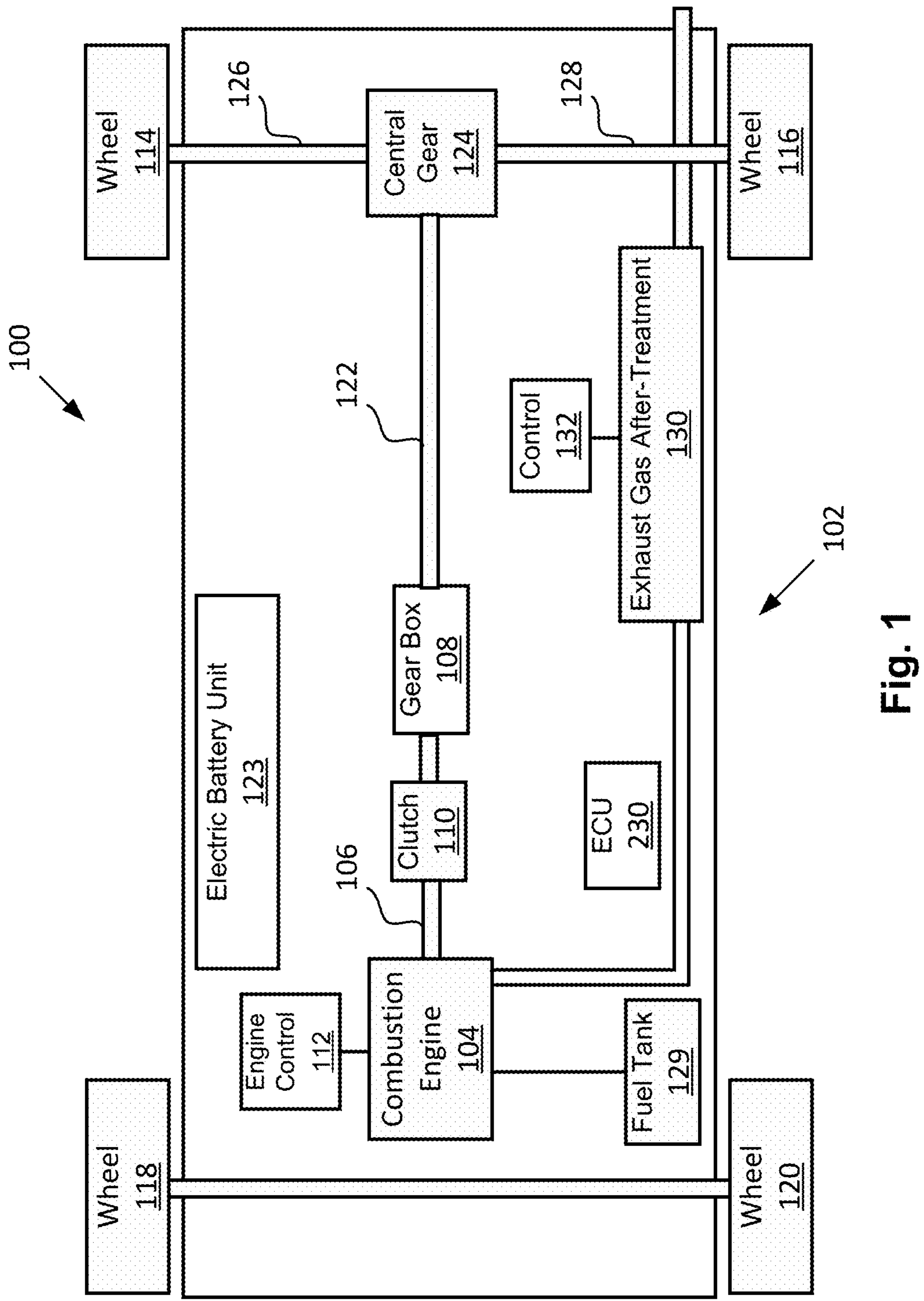
FIG. 1 is a schematic view illustrating an embodiment of the vehicle according to the fourth aspect of the invention, in which embodiments of the present invention may be implemented.

With reference to FIG. 1, a vehicle 100 is schematically illustrated. The vehicle 100 may be called a motor vehicle 100. The vehicle 100 may be a bus, a tractor vehicle or a truck, for example a heavy truck, which for example may be provided with a trailer. The vehicle 100 comprises a powertrain 102, which in the schematically shown embodiment comprises a combustion engine 104, for example an internal combustion engine or another combustion engine, which in a conventional manner, via a first output shaft 106 and usually via a flywheel, is connected to a gearbox 108 via a clutch 110. In general, the combustion engine 104 comprises cylinders. In addition to the powertrain 102 comprising a combustion engine 104, the vehicle 100 may include one or more electrical machines for driving drive wheels 114, 116, 118, 120 of the vehicle 100 and may thus for example be a so-called hybrid vehicle.

The electrical machines may be provided with electric power from one or more electric battery units 123. Each electric battery unit 123 may comprise one or more electric batteries. Each electric battery, or electric battery unit 123, may comprise a plurality of electric battery cells. Each of the electric battery units 123 may be configured to power, i.e. to provide electric power to, said electrical machines. The electric battery unit 123 may be a rechargeable electric battery unit 123. The electric battery unit 123 or units 123 may be called an electric battery pack. Instead of the powertrain 102 comprising a combustion engine 104, the vehicle 100 may include only electrical machines for driving the drive wheels 114, 116, 118, 120 of the vehicle 100, whereby the vehicle 100 may be a pure electrical vehicle.

The combustion engine 104 is controlled by the engine's control system via an engine control device 112. Likewise, the clutch 110 and the gearbox 108 may be controlled by the engine's control system, with the help of one or more control devices (not shown). The engine control device 112 and/or another control device (not shown) may thus be configured to control the combustion engine 104, the clutch 110, the gearbox 108, and/or any other units/devices/entities of the vehicle 100. However, in FIG. 1, only a few of the units/devices/entities of the vehicle 100 are illustrated.

Naturally, the powertrain 102 of the vehicle 100 may be of a different type, such as a type with a conventional automatic gearbox, a type with a hybrid driveline etc. As mentioned above, the powertrain 102 may include one or more electrical machines for driving the drive wheels 114, 116, 118, 120 of the vehicle 100, implementing a so-called hybrid drive. In the shown embodiment, the vehicle 100 comprises a plurality of wheels 114, 116, 118, 120. In the shown embodiment, the vehicle 100 has four wheels 114, 116, 118, 120, but may have more wheels. The electrical machine may be arranged essentially anywhere, as long as torque is provided to one or more of the wheels 114, 116, 118, 120, for example adjacent to one or more of the wheels 114, 116, 118, 120, or along a propeller shaft 122 of the vehicle 100, for example between the gearbox 108 and the clutch 110, as is understood by a skilled person.

The vehicle 100 may comprise a propeller shaft 122 from the gearbox 108 which drives two of the wheels 114, 116 via a central gear 124, for example a conventional differential, and two drive shafts 126, 128 of the vehicle 100. The two drive shafts 126, 128 are connected to the central gear 124. If the vehicle 100 has a powertrain 102 including a combustion engine 104, the vehicle 100 may comprise a fuel tank 129 coupled to the combustion engine 104, and the combustion engine 104 may be provided with fuel from the fuel tank 129.

The vehicle 100 may comprise an exhaust gas after-treatment system 130, which also may be called an exhaust gas purification system, for treatment/purification of the exhaust gas/emissions resulting from the combustion in the combustion chamber of the combustion engine 104. The exhaust gas after-treatment system 130 may be controlled by an exhaust gas after-treatment control device 132, which may communicate with the engine control device 112 or another control device of the engine's control system.

With reference to FIG. 1, the vehicle 100 may comprise an electronic control unit (ECU) 230 (or a plurality of ECUs), for example associated with the electric battery unit 123 or associated with any system or systems (for example a charging interface, or a signal or electric power transfer system) in turn associated with the electric battery unit 123. The electronic control unit 230 may be configured to control one or more electrical systems or subsystems of the vehicle 100. The electronic control unit 230 is disclosed in further detail hereinbelow in connection with FIG. 4.

Figure 2:
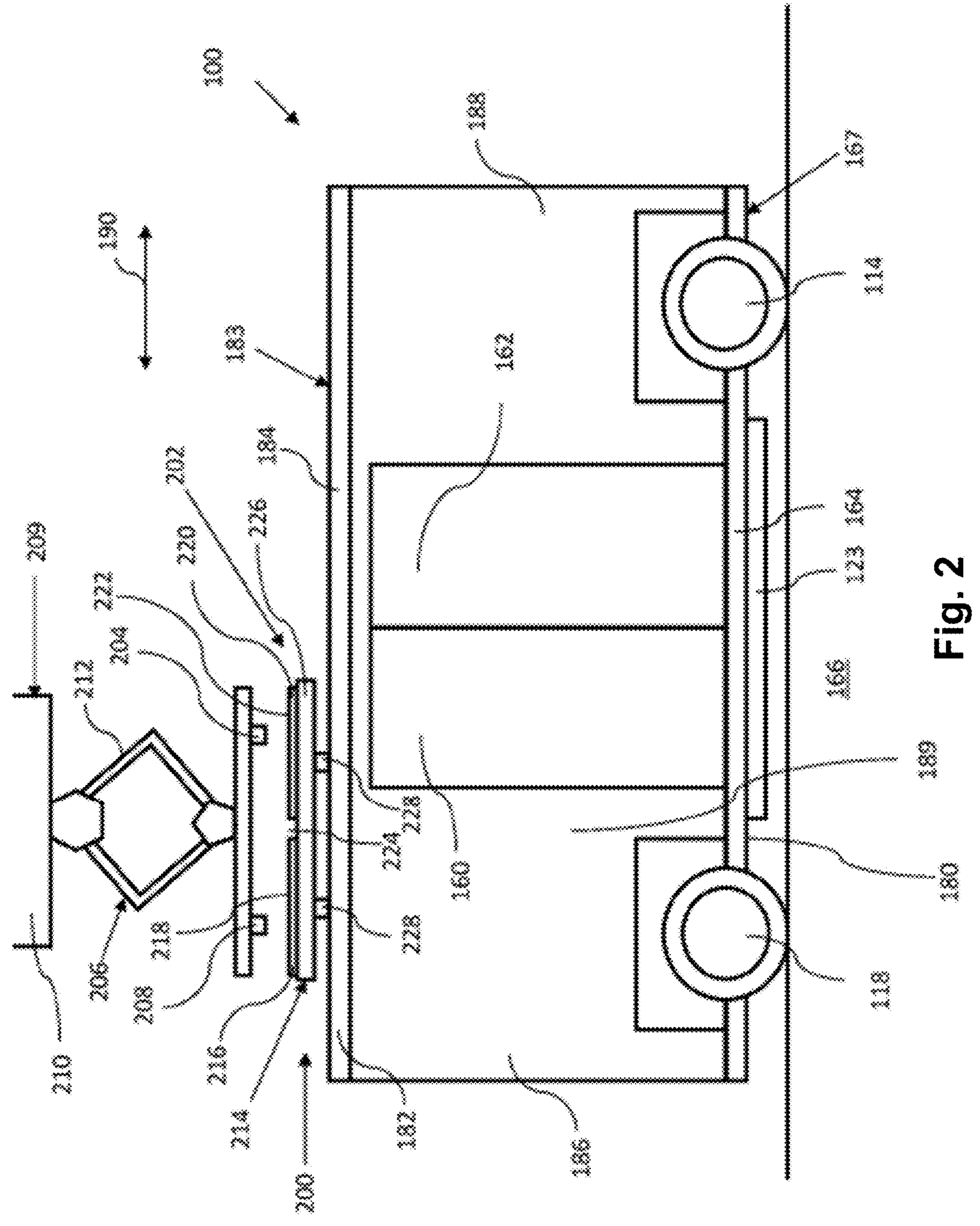
FIG. 2 is a schematic side view of the vehicle of FIG. 1.

With reference to FIG. 2, the vehicle 100, which may be a bus, may include one or more vehicle doors 160, 162 for entering or exiting the vehicle 100. The vehicle 100 may include a chassis unit 167 including a floor 164. As mentioned above in connection with FIG. 1, the vehicle 100 may include a plurality of wheels 114, 116, 118, 120, for example four or more wheels 114, 116, 118, 120 (only two wheels 114, 118 are shown in FIG. 2).

With reference to FIG. 2, the chassis unit 167 may include the electric battery unit 123, which may be located under floor 164, on the floor 164, at least partly in the floor 164, or completely in the floor 164 of the chassis unit 167. For example, the electric battery unit 123 may be mounted or attached to an underside 180 of the floor 164 of the chassis unit 167. The electric battery unit 123 may be attached or mounted to the floor 164 in various possible ways, for example by means of various possible members or means of attachment, for example brackets or bolts etc. Naturally, the electric battery unit 123 may be located elsewhere in the vehicle 100, and the vehicle 100 may be of a different kind than what is shown in FIG. 2. The electric battery unit 123 may be located in the front (front portion) of the vehicle 100 or in the back (back portion) of the vehicle 100. Instead of being located in the floor region, the electric battery unit 123 may be located adjacent to a roof 182 of the vehicle 100, for example on top of the roof 182 or under the roof 182. When the vehicle 100 includes a roof unit 183 including the roof 182, the roof unit 183 may include the electric battery unit 123. Other locations for the electric battery unit 123 are possible. Naturally, combinations of the above-mentioned locations of the electric battery unit 123 are possible. For example, the electric battery units 123 may be located at a plurality of locations of the vehicle 100, for example the plurality of locations mentioned above.

With reference to FIG. 2, the vehicle 100 may include an apparatus 200 for the electrical charging of one or more electric battery units 123 of a vehicle 100. The apparatus 200 may be mounted to the roof 183 or the roof unit 183 of the vehicle 100, as illustrated in FIG. 2, or to any other portion or part of the vehicle 100. The apparatus 200 includes a charging interface 202 for electrically connecting the electrical battery unit 123 of the vehicle 100 to one or more of: a first electrical contact element 204 of a pantograph 206 and a second electrical contact element 208 of the pantograph 206. The pantograph 206 may be mounted to a stationary charging station 209, for example to an overhead structure 210 of the charging station 209, as illustrated in FIG. 2, or to any other structure of the charging station 209. Said apparatus 200 is disclosed in further detail hereinbelow in connection with FIG. 4.

In general, a pantograph 206 in the context of the charging of an electrical vehicle or a hybrid vehicle is a configuration which comprises one or more electrical contact elements 204, 208 and a collapsible and adjustable frame 212, wherein the electrical contact element 204, 208 is carried by the collapsible and adjustable frame 212. The electrical contact element 204, 208 of the pantograph 206 is configured to make contact with one or more electrically conductive members mounted to the vehicle 100 in order to carry electric current from the charging station 209 or the overhead structure 210 (to which the pantograph 206 is mounted) to the vehicle 100 via the electrical contact elements 204, 208 of the pantograph 206, for example to the electric battery unit 123 of the vehicle 100 in order to charge the electric battery unit 123, which may be rechargeable as mentioned above. The collapsible and adjustable frame 212 may have various designs and is not necessarily mounted to an overhead structure 210. In general, as an alternative, the pantograph may be mounted to a vehicle and the electrical contact element of the pantograph may be configured to make contact with one or more electrically conductive members mounted to a stationary structure, for example an overhead structure.

Embodiments of the vehicle 100 disclosed above may correspond to embodiments of the vehicle 100 according to the fourth aspect, with or without the addition of one or more further features and/or the exclusion of one or more of the mentioned features. Naturally, it may be defined that the vehicle 100 is movable, for example in relation to the ground 166 on which the vehicle 100 rests, for example via the plurality of wheels 114, 116, 118, 120.

Figure 4:
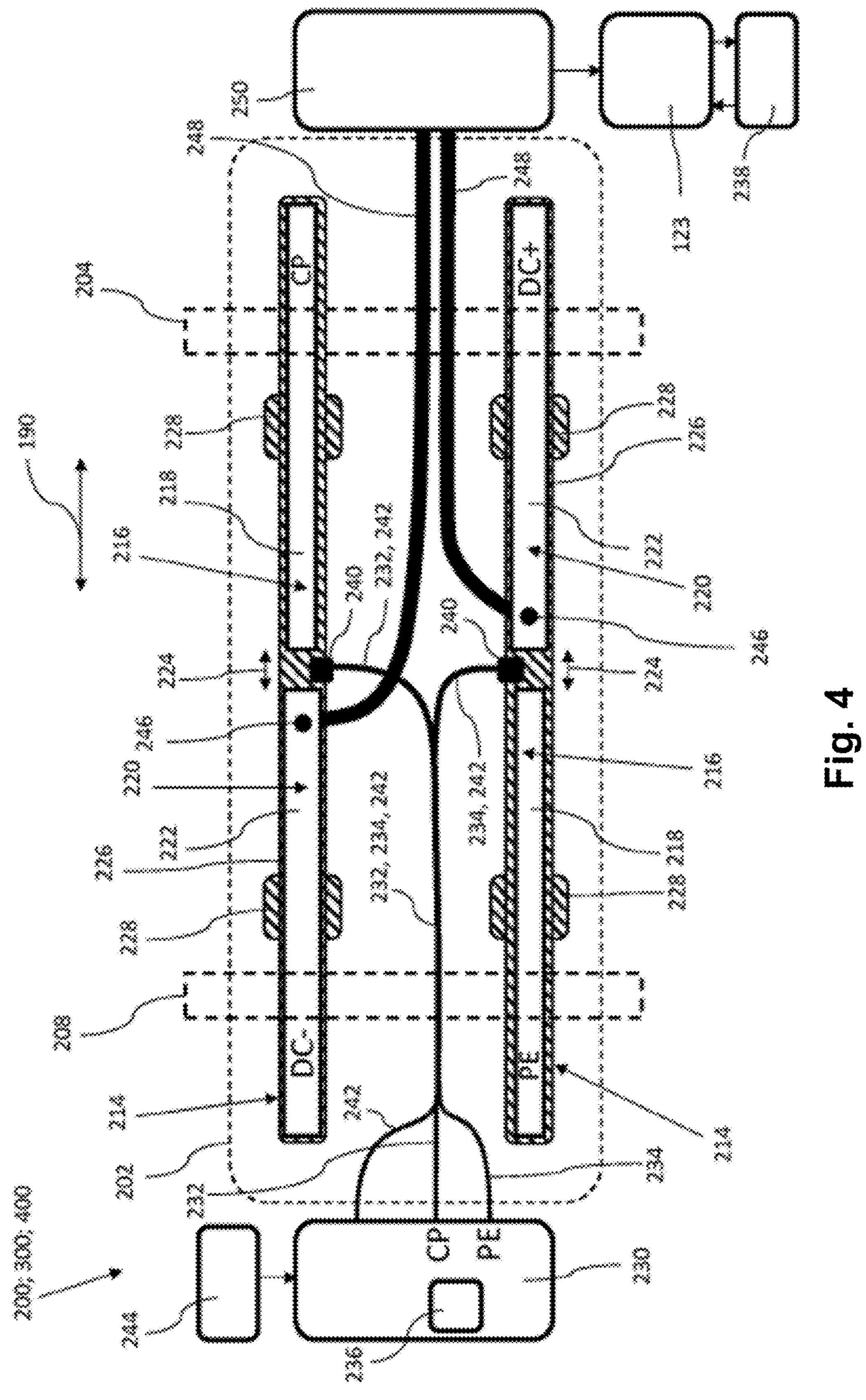
FIG. 4 is a schematic top view of embodiments of the apparatus according to the first aspect, of the arrangement according to the second aspect and of the charging device according to the third aspect.

With reference to FIG. 4, an embodiment of the apparatus 200 for the electrical charging of one or more electric battery units 123 of a vehicle 100 according to the first aspect is schematically illustrated. As mentioned above and with reference to FIGS. 2 and 4, the apparatus 200 includes a charging interface 202 for electrically connecting the electrical battery unit 123 of the vehicle 100 to one 204, 208 or more of: a first electrical contact element 204 of a pantograph 206 and a second electrical contact element 208 of the pantograph 206. In FIG. 4, each of the first and second electrical contact elements 204, 208 of the pantograph 206 is indicated by a dotted line. Each of the first and second electrical contact elements 204, 208 of the pantograph 206 may be elongated and/or may, for example, include an electrically conductive bar or rod, for example made an electrically conductive material, such as a metal or a metal alloy.

With reference to FIGS. 2 and 4, the charging interface 202 includes one or more connectors 214. More specifically, in the shown embodiment the charging interface 202 includes two connectors 214. However, only one of the connectors 214 is shown in FIG. 2. The connector 214 may be elongated and/or may have a longitudinal extension which in length exceeds its width or the length of a transverse extension of the same connector 214. The connector 214 includes a first electrically conductive member 216 and a second electrically conductive member 220. The first electrically conductive member 216 has at least one longitudinal side 218 for electrical contact with one 204, 208 of the first and second electrical contact elements 204, 208 of the pantograph 206 while the second electrically conductive member 220 has at least one longitudinal side 222 for electrical contact with the other one 204, 208 of the first and second electrical contact elements 204, 208 of the pantograph 206. It may be defined that at any location on the longitudinal side 218, 222 the longitudinal side 218, 222 is configured to make electrical contact with any one 204, 208 of: the first electrical contact element 204 of the pantograph 206 and the second electrical contact element 208 of the pantograph 206. The longitudinal side 218, 222 may comprise a contact surface configured to make electrical contact with the first or second electrical contact element 204, 208 of the pantograph 206. Each of the first and second electrically conductive members 216, 220 may be called an electric pole.

With reference to FIG. 4, each of the first and second electrically conductive members 216, 220 may be elongated and/or may have a longitudinal extension which in length exceeds its width or the length of a transverse extension of the respective electrically conductive member 216, 220. Thus, the longitudinal side 218, 222 of each of the first and second electrically conductive members 216, 220 may be elongated and/or may have a longitudinal extension which in length exceeds its width or the length of a transverse extension of the respective longitudinal side 218, 222. Each of the first and second electrically conductive members 216, 220 may, for example, include an electrically conductive bar or rod. Each of the first and second electrically conductive members 216, 220 may be made an electrically conductive material, such as a metal or a metal alloy. Consequently, each of the longitudinal sides 218, 222 may also be made an electrically conductive material, such as a metal or a metal alloy.

With reference to FIGS. 2 and 4, the first electrically conductive member 216 of one 214 of the connectors 214 is spaced apart from the second electrically conductive member 220 of the same connector 214, which means that the first electrically conductive member 216 of one 214 of the connectors 214 is separated from second electrically conductive member 220 of the same connector 214, i.e. there is a space 224 or distance between the first and second electrically conductive members 216, 220 of the same connector 214. The space 224 or distance is not necessary filled with air, but may be. The space 224 or distance may be filled with a material.

With reference to FIGS. 2 and 4, each connector 214 includes a holder 226, i.e. one holder 226, for holding both the first electrically conductive member 216 and the second electrically conductive member 220. The holder 226 may be called a support. Consequently, it may be defined that the first and second electrically conductive members 216, 220 of one 214 of the connectors 214 and the holder 226 of the same connector 214 form a single unit. The holder 226 is attachable to the vehicle 100, i.e. is configured to be attached to the vehicle 100. The holder 226 may be attached to the vehicle 100. It may be defined that the holder 226 is individually attachable, or attached, to the vehicle 100. The holder 226 may be configured to be mounted or attached to the roof 183 or the roof unit 183 of the vehicle 100, as illustrated in FIG. 2, or to any other portion or part, for example an exterior part 184, of the vehicle 100. For example, the holder 226 may include a plurality of flanges 228 via which the holder 226 is attachable to the vehicle 100. The flange 228 may for example be attachable to the vehicle by an attachment, for example a screw attachment including a screw, or may be welded to the vehicle 100.

With reference to FIG. 4, it may be defined that the first electrically conductive member 216 of one 214 of the connectors 214 is electrically insulated from the second electrically conductive member 220 of the same connector 214. Advantageously, the holder 226 may electrically insulate the first electrically conductive member 216 of one 214 of the connectors 214 from the second electrically conductive member 220 of the same connector 214, and may thereby contribute to the electrical insulation of the first electrically conductive member 216 of one 214 of the connectors 214 from the second electrically conductive member 220 of the same connector 214.

As mentioned above and with reference to FIGS. 2 and 4, the holder 226 may be attachable, or even attached, to an exterior part 184 of the vehicle 100, wherein the holder 226 may be configured to electrically insulate the first and second electrically conductive members 216, 220 of the same connector 214 from the exterior part 184 of the vehicle 100. More specifically, when the holder 226 is attachable to the roof 182 of the vehicle 100, the holder 226 may be configured to electrically insulate the first and second electrically conductive members 216, 220 of the same connector 214 from the roof 182 of the vehicle 100.

With reference to FIGS. 2 and 4, each holder 226 may be elongated and/or may have a longitudinal extension which in length exceeds its width or the length of a transverse extension of the same holder 226. The holder 226 may be at least partly made of an electrically insulating material, for example a polymer or a polymer composite. However, other electrically insulating materials are possible. For example, the exterior of the holder 226 may be made of an electrically insulating material while the core of the holder 226 is made of any other material, for example any composite or an electrically conducting material, such as a metal or a metal alloy.

As mentioned above and with reference to FIG. 4, the charging interface 202 may include two connectors 214, which are spaced apart from one another, i.e. placed with a distance to one another. The first electrically conductive member 216 of one 214 of the two connectors 214 may face the second electrically conductive member 220 of the other one 214 of the two connectors 214. Hereby, it may be assured that the transverse first or second electrical contact element 204, 208 of the pantograph 206 makes electrical contact with both a first electrically conductive member 216 of the charging interface 202, which may be specifically configured to transfer electrical signals conveying information, and a second electrically conductive member 220 of the charging interface 202, which may be specifically configured to transfer electric power to the electrical battery unit 123 of the vehicle 100. Expressed alternatively, it may be assured that the first electrically conductive member 216 of one 214 of the two connectors 214 and the second electrically conductive member 220 of the other one 214 of the two connectors 214 make electrical contact with the same one 204, 208 of the first or second electrical contact elements 204, 208 of the pantograph 206.

With reference to FIG. 2, the first and second electrically conductive members 216, 220 of the same connector 214 may be in line with one another. The holder 226 of one 214 of the connectors 214 may be in parallel with, or extend in parallel to, the holder 226 of the other one 214 of the connectors 214. Each of the first and second electrically conductive members 216, 220 of one 214 of the two connectors 214 may extend in parallel with the first and second electrically conductive members 216, 220 of the other one 214 of the two connectors 214. Each longitudinal side 218, 222 of the first and second electrically conductive members 216, 220 of one 214 of the two connectors 214 may extend in parallel to each longitudinal side 218, 222 of the first and second electrically conductive members 216, 220 of the other one 214 of the two connectors 214.

With reference to FIG. 2, the vehicle 100 may have a front 186 and a rear 188. The vehicle 100 may have a longitudinal extension 189 extending between the front 186 and the rear 188 in a longitudinal direction 190. The longitudinal side 218, 222 of each of the first and second electrically conductive members 216, 220 may extend in the longitudinal direction 190 of the vehicle 100 or in parallel to the longitudinal direction 190 of the vehicle 100. In alternative embodiments, the longitudinal side 218, 222 of each of the first and second electrically conductive members 216, 220 may extend transversely to the longitudinal direction 190 of the vehicle 100.

With reference to FIG. 4, the first electrically conductive member 216 may be configured or adapted, or specifically designed, for the transfer of electrical signals conveying information between an electronic control unit, ECU, 230 of the vehicle 100 and any one 204, 208 of the first and second electrical contact elements 204, 208 of the pantograph 206 while the second electrically conductive member 220 is configured or adapted, or specifically designed, for the transfer of electric power to the electrical battery unit 123 of the vehicle 100 from one 204, 208 or more of: the first electrical contact element 204 of the pantograph 206 and the second electrical contact element 208 of the pantograph 206. It may be defined that the composition, structure and/or configuration of the first electrically conductive member 216 are/is different from the composition, structure and/or configuration of the second electrically conductive member 220.

In general, the electric power is transferred to the electrical battery unit 123 at a high voltage, for example above 50 or 60 V, which is higher than the voltage at which the electrical signals conveying information generally is preferably transferred. In general, the electrical signals conveying information to and/or from an electronic control unit 230 is transferred at a low voltage, for example below 50 V, which is lower than the high voltage at which the electric power is transferred. Thus, the second electrically conductive member 220 may be adapted for high voltages mentioned above. For example, the second electrically conductive member 220 may be made of plain copper or a copper alloy. The first electrically conductive member 216 may be adapted for low voltages mentioned above. The first electrically conductive member 216 may be made of a material which is harder than copper, for example a copper-free or non-copper metal or metal alloy, i.e. a metal or metal alloy excluding, i.e. not including, copper. The first electrically conductive member 216 may be made of a material which is corrosion-protected. The first electrically conductive member 216 may be made of a material which has a decreased electrical resistance compared to the material of the second electrically conductive member 220 and thus has lower losses, for example compared to the material of the second electrically conductive member 220, which is advantageous for the transfer of electrical signals that convey information. For example, the area or contact area of the longitudinal side 218 of the first electrically conductive member 216 may be smaller than the area or contact area of the longitudinal side 222 of the second electrically conductive member 220, for example by at least 10 percent, because the smaller area of the longitudinal side 218 of the first electrically conductive member 216 provides a higher pressure on the longitudinal side 218 of the first electrically conductive member 216 from one 204, 208 of the electrical contact elements 204, 208 of the pantograph 206 (compared to the pressure on the longitudinal side 222 of the second electrically conductive member 220), which is advantageous fort the electrical signal transfer.

In the context of the charging of an electrical vehicle 100 or a hybrid vehicle 100, such as an electrical vehicle 100, which may be called a battery electric vehicle, BEV, when the charging interface 202 includes four electrically conductive members 216, 220, the interface 202 of the apparatus 200 according to the first aspect includes two connectors 214, as illustrated in FIG. 4. With reference to FIG. 4, the first electrically conductive member 216 of one 214 of the connectors 214 (in FIG. 4, the upper connector 214) may be electrically connected, or connectable, to a so called CP (control pilot) communication line 232 while the first electrically conductive member 216 of the other one 214 of the connectors 214 (in FIG. 4, the lower connector 214) may be electrically connected, or connectable, to a so called PE (protected earth) communication line 234. The second electrically conductive member 220 of one 214 of the connectors 214 (in FIG. 4, the upper connector 214) may be electrically connected or connectable to, or constitute, DC− while the second electrically conductive member 220 of the other one 214 of the connectors 214 (in FIG. 4, the lower connector 214) may be electrically connected or connectable to, or constitute, DC+. The apparatus 200 may include a communication controller 236, for example an electric vehicle communication controller, for controlling the communication between the charging station 209 and the vehicle 100, for example the electronic control unit, ECU, 230. The electronic control unit, ECU, 230 may include the communication controller 236, or the expressed alternatively, the communication controller 236 may be incorporated in the electronic control unit, ECU, 230. The communication controller 236, or the ECU 230, may be configured to communicate with a battery managing system 238 connected to and associated with the electric battery unit 123, for example configured to receive information from the battery managing system 238.

By means of the CP (control pilot) signal, which is inter alia transferred via the CP (control pilot) communication line 232, and the communication controller 236, the vehicle 100 can be identified, the status of the charging interface 202 can be determined, for example if the charging interface 202 is connected to the electrical contact elements 204, 208 of the pantograph 206, and the communication between the charging station 209 and the vehicle 100 may be initiated. After connection between the vehicle 100 and the charging station 209 via the charging interface 202, the communication between the charging station 209 and the vehicle 100 may be performed via wireless communication, for example for starting and ending the charging of the electric battery unit 123.

With reference to FIG. 4, each connector 214 includes an electrical connecting unit 240 (such as an electrical contact) for both a line 232; 234 for the transfer of electrical signals conveying information between the first electrically conductive member 216 and an electronic control unit 230 of the vehicle and a line 242 for heat transfer from a heater 244 of the vehicle 100 to the first and second electrically conductive members 216, 220. Thus, the electrical connecting unit 240 is electrically connectable to a line 232; 234 for the transfer of electrical signals conveying information and a line 242 for heat transfer. Expressed alternatively, a line 232; 234 for the transfer of electrical signals conveying information and a line 242 for heat transfer are connectable to the same electrical connecting unit 240. The electrical connecting unit 240 may be located between the first and second electrically conductive members 216, 220 of the same connector 214, for example in the space 224 between the first and second electrically conductive members 216, 220 of the same connector 214. The first and second electrically conductive members 216, 220 are advantageously provided with heat from the heater 240 via the line 242 when the outdoor conditions or climate so requires, for example when the outdoor temperature is below zero degrees Celsius and ice may form on the first and second electrically conductive members 216, 220. A heater 240 used for this purpose is known to the skilled person and thus not disclosed in further detail. Each line 232, 234, 242 may include an electrical conductor, for example an electrical cable. Two or three of the lines 232, 234, 242 may at least partly be enclosed by a common sheath. However, this is not necessary. Other configurations for the lines 232, 234, 242 are possible. By means of the innovative electrical connecting unit 240 the number of electrical connections of the charging interface 202 is reduced in relation to conventional charging interfaces. Each connector 214 may comprise a second electrical connecting unit 246 for a line 248 for the transfer of electric power to the electrical battery unit 123 of the vehicle 100. The line 248 may include an electrical conductor, for example an electrical cable, such as a high voltage cable. The line 248 is configured to electrically connect the second electrically conductive member 220 to the electrical battery unit 123, for example via a vehicle electrical system 250, which may be called vehicle high voltage system (VCB). The second electrical connecting unit 246 may include a bolt type connection.

Further, with reference to FIG. 4, an arrangement 300 for the electrical charging of one or more electric battery units 123 of a vehicle 100 according to the second aspect is provided. The arrangement 300 includes a charging interface 202 for electrically connecting the electrical battery unit 123 of the vehicle 100 to one or more of: a first electrical contact element 204 of a pantograph 206 (see FIG. 2) and a second electrical contact element 208 of the pantograph 204. The charging interface 202 includes one or more connectors 214. The connector 214 comprises a first electrically conductive member 216 and a second electrically conductive member 220. The first electrically conductive member 216 has at least one longitudinal side 218 for electrical contact with one 204, 208 of the first and second electrical contact elements 204, 208 of the pantograph 206 while the second electrically conductive member 220 has at least one longitudinal side 222 for electrical contact with the other one 204, 208 of the first and second electrical contact elements 204, 208 of the pantograph 206. The first electrically conductive member 216 of one 214 of the connectors 214 is spaced apart from the second electrically conductive member 220 of the same connector 214. The first electrically conductive member 216 is configured for the transfer of electrical signals conveying information between an electronic control unit, ECU, 230 of the vehicle 100 and any one 204, 208 of the first and second electrical contact elements 204, 208 of the pantograph 206 while the second electrically conductive member 220 is configured for the transfer of electric power to the electrical battery unit 123 of the vehicle 100 from one 204, 208 or more of: the first electrical contact element 204 of the pantograph 206 and the second electrical contact element 208 of the pantograph 206. Otherwise, one or more of the features of the arrangement 300 may correspond to one or more of the features of the apparatus 200 disclosed above.

Further, with reference to FIG. 4, a charging device 400 for the electrical charging of one or more electric battery units 123 of a vehicle 100 according to the third aspect is provided. The charging device 400 includes a charging interface 202 for electrically connecting the electrical battery unit 123 of the vehicle 100 to one 204, 208 or more of: a first electrical contact element 204 of a pantograph 206 (see FIG. 2) and a second electrical contact element 208 of the pantograph 206. The charging interface 202 has one or more connectors 214. The connector 214 includes a first electrically conductive member 216 and a second electrically conductive member 220. The first electrically conductive member 216 has at least one longitudinal side 218 for electrical contact with one 206, 208 of the first and second electrical contact elements 204, 208 of the pantograph 206 while the second electrically conductive member 220 has at least one longitudinal side 222 for electrical contact with the other one 204, 208 of the first and second electrical contact elements 204, 208 of the pantograph 206. The first electrically conductive member 216 of one 214 of the connectors 214 is spaced apart from the second electrically conductive member 220 of the same connector 214. The connector 214 includes an electrical connecting unit 240 for a line 232, 234 for the transfer of electrical signals conveying information between the first electrically conductive member 216 and an electronic control unit, ECU, 230 of the vehicle 100 and a line 242 for heat transfer from a heater 244 of the vehicle 100 to the first and second electrically conductive members 216, 220. Otherwise, one or more of the features of the charging device 400 may correspond to one or more of the features of the apparatus 200 disclosed above.

Figure 3:
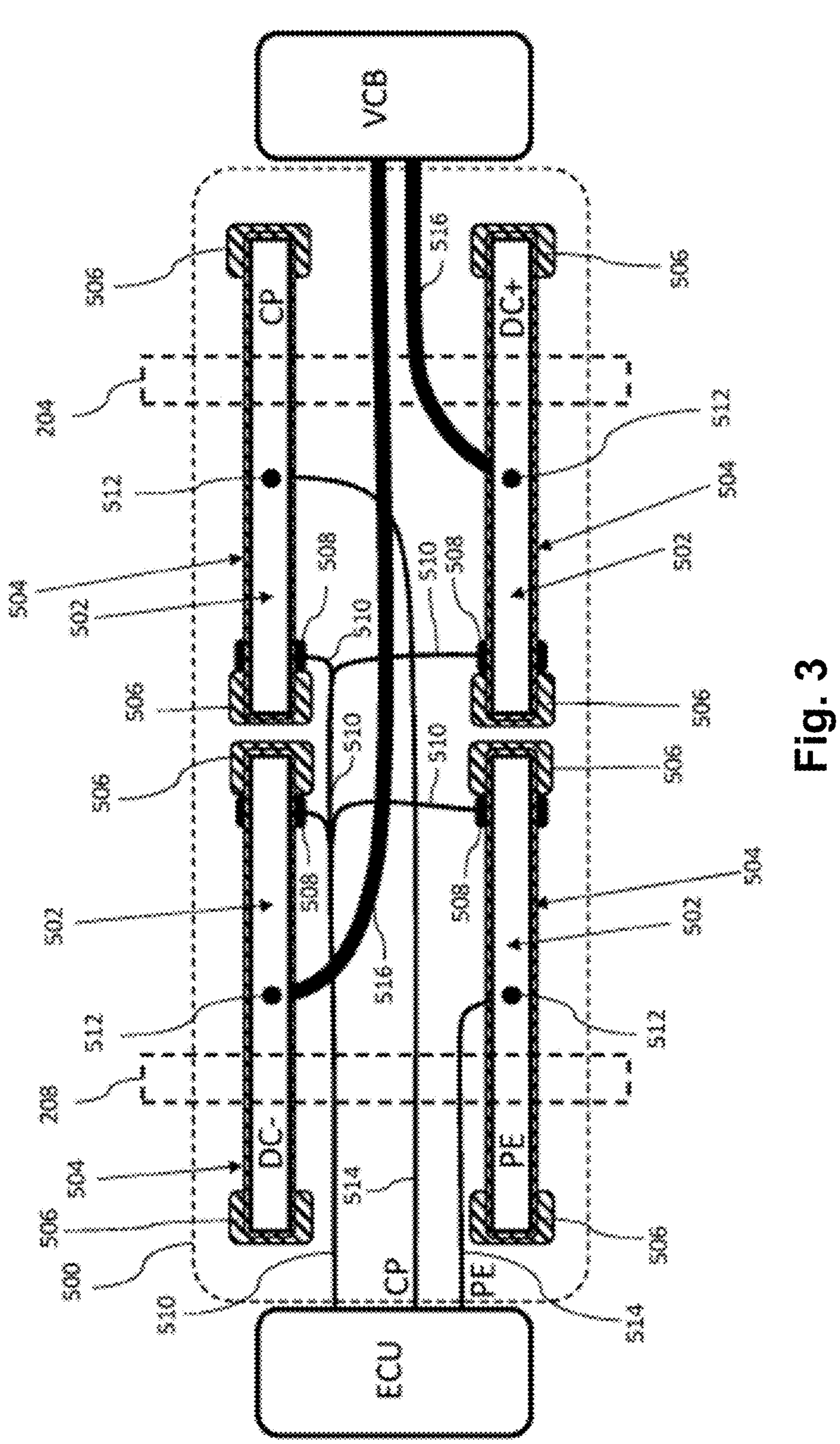
FIG. 3 is a schematic top view of a conventional charging interface.

With reference to FIG. 3, in order to put the apparatus 200 according the first aspect, the arrangement 300 according to the second aspect and the charging device 400 according to the third aspect into perspective, a conventional charging interface 500 with four electrically conductive members 502 (which may be called rails 502 in conventional technology) according to conventional technology is illustrated. All four electrically conductive members 502 are identical, despite whether the electrically conductive member 502 is involved in the transfer of electrical signals conveying information or in the transfer of electric power to the electric battery or battery pack of the vehicle. However, the inventors have identified that an electrically conductive member 502 suitable for the transfer of electric power at high voltage is not suitable for the transfer of electrical signals conveying information. Each electrically conductive member 502 is held or carried by its own connector 504. Each connector 504 is individually attached to the roof of the vehicle. Thus, each connector 504 requires enough flanges 506 to secure the individual connector 504, which holds a single electrically conductive member 502, to the roof of the vehicle. Each electrically conductive member 502, or each connector 504, is associated with its own first electrical connection 508 for a line 510 or cable for heat transfer from a heater of the vehicle to the electrically conductive members 502 and its own second electrical connection 512 for a line 514 or cable for the transfer electrical signals conveying information or a line 516 for the transfer of electric power to the electrical battery or battery pack of the vehicle. Thus, in conventional charging interfaces, each electrically conductive member 502 is associated with two electrical connections 508, 512, or stated alternatively, each pair of electrically conductive members 502 is associated with four electrical connections 508, 512. The four second electrical connections 512 are identical and in general bolt type connections, which are expensive, irrespective whether the second electrical connection 512 is connected to a line for the transfer electrical signals conveying information (when the bolt type connection is oversized for its purpose) or a line for the transfer of electric power to the electrical battery or battery pack of the vehicle.

The present invention is not limited to the above described embodiments. Instead, the present invention relates to, and encompasses all different embodiments being included within the scope of the appended independent claims.

The invention claimed is:

1. An apparatus for electrical charging of one or more electric battery units of a vehicle, wherein the apparatus comprises:

- a charging interface comprising two separate connectors for electrically connecting the one or more electrical battery units of the vehicle to first and second electrical contact elements of a pantograph,
- wherein each of the two separate connectors of the charging interface comprises;
  - a first electrically conductive member and a second electrically conductive member spaced apart from each other, wherein the first electrically conductive member of the connector comprises at least one longitudinal side for electrical contact with one of the first and second electrical contact elements of the pantograph and the second electrically conductive member comprises at least one longitudinal side for electrical contact with the other one of the first and second electrical contact elements of the pantograph; and
  - a holder for holding the first and second electrically conductive members,
  - wherein, collectively, the first and second electrically conductive members and the respective holder of the connector form a single unit that is individually attachable to the vehicle, such that each connector of the two separate connectors can be separately attached to the vehicle.

2. An apparatus according to claim 1, wherein the first electrically conductive member of each of the two separate connectors of the charging interface is configured for the transfer of electrical signals conveying information between an electronic control unit of the vehicle and any one of the first and second electrical contact elements of the pantograph, while the second electrically conductive member of each of the two separate connectors of the charging interface is configured for the transfer of electric power to the electrical battery unit of the vehicle from one or more of: the first electrical contact element of the pantograph and/or the second electrical contact element of the pantograph.

3. An apparatus according to claim 1, wherein of each of the two separate connectors of the charging interface further comprises;

- an electrical connecting unit comprising:
  - a line for the transfer of electrical signals conveying information between the first electrically conductive member and an electronic control unit of the vehicle; and
  - a line for heat transfer from a heater of the vehicle to the first and second electrically conductive members.

4. An apparatus according to claim 1, wherein the first electrically conductive member of each of the two separate connectors of the charging interface is electrically insulated from the second electrically conductive member.

5. An apparatus according to claim 1, wherein the holder of each of the two separate connectors of the charging interface electrically insulates the first electrically conductive member from the second electrically conductive member.

6. An apparatus according to claim 1, wherein the holder of each of the two separate connectors of the charging interface is attachable to an exterior part of the vehicle, and wherein the holder is configured to electrically insulate the first and second electrically conductive members from the exterior part of the vehicle.

7. An apparatus according to claim 1, wherein the holder of each of the two separate connectors of the charging interface is attachable to a roof of the vehicle, and wherein the holder is configured to electrically insulate the first and second electrically conductive members from the roof of the vehicle.

8. An apparatus according to claim 1, wherein the holder of each of the two separate connectors of the charging interface is at least partly made of an electrically insulating material.

9. An apparatus according to claim 1, wherein at any location on the longitudinal side of either of the first or second electrically conductive members, such longitudinal side is configured to make electrical contact with any one of: the first electrical contact element of the pantograph and the second electrical contact element of the pantograph.

10. An apparatus according to claim 1, wherein the first electrically conductive member of one of the two separate connectors faces the second electrically conductive member of the other one of the two separate connectors.

11. An arrangement for the electrical charging of one or more electric battery units of a vehicle, wherein the arrangement comprises:

- a charging interface comprising two separate connectors for electrically connecting the one or more electrical battery units of the vehicle to first and second electrical contact elements of a pantograph,
- wherein each of the two separate connectors of the charging interface comprises:
  - a first electrically conductive member and a second electrically conductive member spaced apart from each other, wherein the first electrically conductive member of the connector comprises at least one longitudinal side for electrical contact with one of the first and second electrical contact elements of the pantograph and the second electrically conductive member comprises at least one longitudinal side for electrical contact with the other one of the first and second electrical contact elements of the pantograph; and a holder for holding the first and second electrically conductive members, wherein, collectively, the first and second electrically conductive members and the respective holder of the connector form a single unit that is individually attachable to the vehicle, such that each connector of the two separate connectors can be separately attached to the vehicle, wherein the first electrically conductive member is configured for the transfer of electrical signals conveying information between an electronic control unit of the vehicle and any one of the first and second electrical contact elements of the pantograph, and wherein the second electrically conductive member is configured for the transfer of electric power to the electrical battery unit of the vehicle from one or more of: the first electrical contact element of the pantograph and/or the second electrical contact element of the pantograph.

12. A charging device for the electrical charging of one or more electric battery units of a vehicle, wherein the charging device comprises:

a charging interface comprising two separate connectors for electrically connecting the one or more electrical battery units of the vehicle to first and second electrical contact elements of a pantograph, wherein each of the two separate connectors of the charging interface comprises;

a first electrically conductive member and a second electrically conductive member spaced apart from each other, wherein the first electrically conductive member of the connector comprises at least one longitudinal side for electrical contact with one of the first and second electrical contact elements of the pantograph and the second electrically conductive member comprises at least one longitudinal side for electrical contact with the other one of the first and second electrical contact elements of the pantograph;

a holder for holding the first and second electrically conductive members, wherein, collectively, the first and second electrically conductive members and the respective holder of the connector form a single unit that is individually attachable to the vehicle, such that each connector of the two separate connectors can be separately attached to the vehicle; and an electrical connecting unit comprising:

a line for the transfer of electrical signals conveying information between the first electrically conductive member and an electronic control unit of the vehicle; and a line for heat transfer from a heater of the vehicle to the first and second electrically conductive members.

13. A vehicle comprising an apparatus for the electrical charging of one or more electric battery units of the vehicle, wherein the apparatus comprises:

a charging interface comprising two separate connectors for electrically connecting the one or more electrical battery units of the vehicle to first and second electrical contact elements of a pantograph, wherein each of the two separate connectors of the charging interface comprises:

a first electrically conductive member and a second electrically conductive member spaced apart from each other, wherein the first electrically conductive member of the connector comprises at least one longitudinal side for electrical contact with one of the first and second electrical contact elements of the pantograph and the second electrically conductive member comprises at least one longitudinal side for electrical contact with the other one of the first and second electrical contact elements of the pantograph; and a holder for holding the first and second electrically conductive members, wherein, collectively, the first and second electrically conductive members and the respective holder of the connector form a single unit that is individually attachable to the vehicle, such that each connector of the two separate connectors can be separately attached to the vehicle.

14. A vehicle according to claim 13, wherein the vehicle has a front and a rear, wherein the vehicle has a longitudinal extension extending between the front and the rear in a longitudinal direction, and wherein the longitudinal side of either of the first or second electrically conductive members extends in the longitudinal direction of the vehicle.

* * * * *